US012440893B2

(12) United States Patent
Silbermann et al.

(10) Patent No.: US 12,440,893 B2
(45) Date of Patent: Oct. 14, 2025

(54) METHOD FOR POWDER PRESSING AT LEAST TWO PRESS PARTS AND POWDER PRESSING DEVICE

(71) Applicant: DORST Technologies GmbH & Co. KG, Kochel am See (DE)

(72) Inventors: Michael Silbermann, Bichl (DE); Christian Müller, Großweil (DE); Johannes Bader, Ohlstadt (DE)

(73) Assignee: DORST Technologies GmbH & Co. KG, Kochel am See (DE)

( * ) Notice: Subject to any disclaimer, the term of this patent is extended or adjusted under 35 U.S.C. 154(b) by 865 days.

(21) Appl. No.: 17/310,684

(22) PCT Filed: Feb. 11, 2020

(86) PCT No.: PCT/EP2020/053415
§ 371 (c)(1),
(2) Date: Aug. 17, 2021

(87) PCT Pub. No.: WO2020/169403
PCT Pub. Date: Aug. 27, 2020

(65) Prior Publication Data
US 2022/0072609 A1 Mar. 10, 2022

(30) Foreign Application Priority Data
Feb. 18, 2019 (DE) ..................... 10 2019 104 041.8

(51) Int. Cl.
*B22F 3/00* (2021.01)
*B22F 3/03* (2006.01)
(Continued)

(52) U.S. Cl.
CPC ................ *B22F 3/004* (2013.01); *B22F 3/03* (2013.01); *B28B 3/083* (2013.01);
(Continued)

(58) Field of Classification Search
CPC . B22F 3/004; B22F 3/03; B28B 3/083; B28B 17/0072; B30B 11/02; B30B 15/304
(Continued)

(56) References Cited

U.S. PATENT DOCUMENTS

| | | | | |
|---|---|---|---|---|
| 3,720,738 | A | 3/1973 | Munk | |
| 9,272,443 | B2 * | 3/2016 | Menzel .................. | B30B 11/02 |
| 2005/0238749 | A1 | 10/2005 | Freidhoff et al. | |

FOREIGN PATENT DOCUMENTS

| | | | |
|---|---|---|---|
| DE | 42 09 767 | C1 | 5/1993 |
| DE | 100 20 954 | A1 | 11/2000 |

(Continued)

OTHER PUBLICATIONS

Over Masuda Tadao [JP2012071323A] (Machine translation) (Year: 2012).*

(Continued)

*Primary Examiner* — Sally A Merkling
*Assistant Examiner* — Nazmun Nahar Shams
(74) *Attorney, Agent, or Firm* — Knobbe, Martens, Olson & Bear, LLP

(57) ABSTRACT

The invention relates to a method for powder pressing at least two pressed parts, in particular ceramic powder pressed parts and/or metal powder pressed parts, wherein a first powder (17) for pressing a first pressed part is filled into a first cavity (13) of a die (12) with a first filling level and a second powder (18) for pressing a second pressed part is filled into a second cavity (14) of the die (12) with a second filling level, wherein the first and second filling levels are individually adjusted. Preferably, the first powder is filled via a first filling shoe and the second powder is filled via a second filling shoe, wherein the two filling shoes, at least temporarily, are not moved simultaneously. A powder press-
(Continued)

ing device is also claimed which is suitable for implementing the aforementioned method.

10 Claims, 7 Drawing Sheets

(51) Int. Cl.

| | |
|---|---|
| ***B28B 3/08*** | (2006.01) |
| ***B28B 17/00*** | (2006.01) |
| ***B30B 11/02*** | (2006.01) |
| ***B30B 15/30*** | (2006.01) |

(52) U.S. Cl.
CPC .......... *B28B 17/0072* (2013.01); *B30B 11/02* (2013.01); *B30B 15/304* (2013.01)

(58) Field of Classification Search
USPC .......................................................... 419/66
See application file for complete search history.

(56) References Cited

FOREIGN PATENT DOCUMENTS

| | | | |
|---|---|---|---|
| DE | 102 09 746 | A1 | 10/2003 |
| JP | 2 872286 | B2 | 3/1999 |
| JP | 2000024799 | A | 1/2000 |
| JP | 2003181695 | A | 7/2003 |
| JP | 2007196244 | A | 8/2007 |
| JP | 2012 071323 | A | 4/2012 |
| JP | 2012 245 562 | A | 12/2012 |
| KR | 10 1 058 145 | B1 | 8/2011 |
| KR | 101058154 | B1 | 8/2011 |
| KR | 10 2013 0 022 356 | A | 2/2013 |

OTHER PUBLICATIONS

Chinese Office Action issued in corresponding Chinese Patent Application No. 202080015067.6, dated Feb. 7, 2023 in 21 pages including English translation.
German Search Report issued for German Patent Application No. 102019104041.8, dated Oct. 16, 2019 in 130 pages.
International Search Report issued for International Patent Application No. PCT/EP2020/053415, dated Jun. 15, 2020 in 152 pages.
Written Opinion issued for International Patent Application No. PCT/EP2020/053415, dated Jun. 15, 2020 in 9 pages.

* cited by examiner

METHOD FOR POWDER PRESSING AT LEAST TWO PRESS PARTS AND POWDER PRESSING DEVICE

CROSS-REFERENCE TO RELATED APPLICATIONS

This application is the U.S. National Phase under 35. U.S.C. § 371 of International Application PCT/EP2020/053415, filed Feb. 11, 2020, which claims priority to Germany Patent Application No. 10 2019 104 041.8, filed Feb. 18, 2019. The disclosures of the above-described applications are hereby incorporated by reference in their entirety.

FIELD OF THE INVENTION

The invention relates to a method for powder pressing at least two pressed parts, in particular ceramic powder pressed parts and/or metal powder pressed parts, and to a corresponding pressing device.

BACKGROUND OF THE INVENTION

In order to be able to press several pressed parts from one (powdery) starting material (and indeed in one pressing process), several cavities must be provided. For this purpose, the starting material (powder) for both cavities is prepared together and filled in accordingly before the actual pressing. The quality of the pressed parts produced in this way is considered to be in need of improvement.

SUMMARY OF THE INVENTION

It is therefore object of the present invention to propose a method for powder pressing at least two pressed parts as well as a corresponding pressing device, wherein the quality (in particular with respect to the dimensions and/or the weight of the pressed parts) is to be improved.

In particular, the object is solved by a method for powder pressing at least two pressed parts, in particular ceramic powder pressed parts and/or metal powder pressed parts, wherein a first powder (in particular comprising metal and/or ceramic) for pressing a first pressed part is filled into a first cavity of a die with a first filling level and a second powder (comprising a metal and/or ceramic material) for pressing a second pressed part is filled into a second cavity of the die with a second filling level, wherein the first and second filling levels are set independently of each other. After filling, a pressing process then preferably follows, in which the at least two pressed parts are pressed preferably simultaneously or at least overlapping in time.

A core idea of the invention is to set the first and second filling level independently of each other. In this context, it was recognised according to the invention that a filling can behave differently in several (for example two) cavities (even with careful adjustment of, for example, fillers and/or filling tubes). Due to the fact that the filling level for both (or several) cavities is/can now not only be changed together (but individually or independently of each other), a significant increase in quality can be achieved.

The die is preferably manufactured in one piece, in particular in one piece (possibly monolithic), but can also consist of several parts. A press (pressing device) used in the method can have at least or exactly one or at least or exactly two upper punches and optionally at least or exactly one or at least or exactly two lower punches per cavity. During pressing, the (respective) lower punch is preferably fixed, i.e. not floating or hydraulic.

The filling level can be understood in particular by the distance of the lowest point of a corresponding filling with respect to a highest point of a corresponding filling (after completion of the filling process and before the subsequent pressing) and/or by the height (vertical distance) of the corresponding fillings with respect to a (common) reference point (after completion of the filling process and before the subsequent pressing), e.g. with respect to an upper end of the respective cavity and/or an upper surface of the possibly common die and/or a (fixed) foundation of the pressing device. By an individual adjustment of the (respective) filling level it is to be understood in particular that the filling level (for example the first filling level) can be adjusted independently of the respective other filling level (for example of a second filling level) or can be varied (in particular compared to a previous filling process). For example, it is possible that the one (e.g. first) filling level is changed or changeable (compared to a previous filling level in a previous pressing operation), while the second filling level is not changed (compared to a previous filling level in the previous pressing operation).

In embodiments, the size (or the volume) of at least one (or both or all) cavity(ies) can be varied, in particular increased, between a time at which filling of the cavity begins and a time at which filling of the cavity is completed. In this way, an adjustment of the filling level can be achieved in a particularly simple manner, for example when the cavity is filled (in a particular filling step) up to an upper edge. However, it is also possible to adjust the (respective) cavity accordingly already before the filling process starts and not to change it afterwards any more (with regard to its volume, until the filling process is finished). Generally, however, the step of adjusting the filling level comprises at least one change in the volume of at least one cavity, in particular an increase in the volume thereof.

Preferably, the first powder is filled via a first filling shoe and the second powder is filled via a second filling shoe. Preferably, the filling shoes are spaced apart from each other or at least structurally delimited or have powder material receptacles that are delimited from each other. Further preferably, the first and second filling shoes are at least temporarily non-simultaneously movable or are correspondingly non-simultaneously moved. In specific embodiments, one (in particular first) filling shoe can be removed from one (first) cavity, while the other (second) filling shoe remains above the other (second) cavity. This allows an individual setting to be made in a particularly simple manner. In particular, this makes it possible for the two filling shoes not always to be arranged simultaneously above their respective cavity (or to be arranged simultaneously away from it), so that, for example, only one cavity is filled but not the other. This is a simple way to improve the part quality.

When filling into at least one, preferably the second, cavity, at least two filling operations can be performed. At least two filling operations are to be present in particular when the filling is interrupted and/or during the filling an interruption of the filling at another cavity (in particular the first cavity) takes place. A first filling operation for filling the second powder into the second cavity preferably occurs before and/or during a filling operation for filling the first powder into the first cavity. A second filling operation for filling the second powder into the second cavity preferably takes place while no filling operation for filling the first powder into the first cavity takes place, in particular after the first filling shoe has already been moved away from the first cavity. When in this context two (or more) filling operations are referred to, this is to be understood as two different time periods of a common overall filling operation, whereby an overall filling operation is in turn to be understood as an operation in which the material to be pressed is completely filled into the corresponding cavity so that it can subsequently be pressed. Two filling processes thus refer in particular not to a repeated filling of the cavity for pressing several pressed parts, but to a multi-stage (comprising several steps) filling of the same cavity. Overall, an individual setting can be made possible in a simple manner.

Preferably, a complete filling of the first cavity is finished before a complete filling of the second cavity is finished. Also in this way, an individual adjustment of the filling level can be achieved in a simple manner.

According to an embodiment, at least one first lower punch associated with the first cavity and/or at least one second lower punch associated with the second cavity is/are supported in a non-floating manner (or via a fixed stop). In particular, the first and/or second lower punch should not move during pressing (apart from compression movements), but remain stationary. In particular, the first and/or second lower punch should not be hydraulically supported (during pressing).

Preferably, the first and/or second pressed part are measured, in particular individually, after pressing, preferably weighed. Based on the measurement (in particular the weighing), a new first and/or second filling level is preferably determined, in particular calculated. Further preferably, a complete filling of that cavity to which a lower filling level has been assigned can subsequently take place before the other cavity is completely filled. If the filling level can only be changed for both cavities together, a (preferably automatic) filling level adjustment takes place, in particular based on the average value of the weight of both pressed parts. By individually adjusting the filling level and individually measuring the pressed part, a significant overall increase in quality can be achieved.

In general, the adjustment of the filling level can be done automatically (in particular by means of an electronic control device), whereby a corresponding measurement of the pressed parts is used for this purpose. Depending on this measurement, a corresponding filling level can then be varied or adjusted. Overall, an increase in quality is thus achieved in a simple manner.

First and/or second cavity are preferably filled to their respective upper edge after the respective (complete) filling and/or immediately before an interruption of the respective (complete) filling and/or between a first and a second filling process and/or immediately before a pressing process. First and/or second cavity may also not be filled to their respective upper edge after the respective (complete) filling and/or immediately before an interruption of the respective (complete) filling and/or between two filling processes and/or immediately before a pressing process. In particular, after (complete) filling, the second cavity is filled to its upper edge and the first cavity is not (or vice versa).

After the respective (complete) filling of the first and second cavity and/or immediately before a pressing operation, an upper end of a first filling in the first cavity and an upper end of a second filling in the second cavity may be at the same height or at different heights.

Furthermore, after the respective (complete) filling of the first and second cavity and/or immediately before a pressing process, a lower end of a first filling in the first cavity and a lower end of a second filling in the second cavity may be at the same height or at different heights.

By means of the at least two cavities, two (with respect to weight and/or geometry) identical or at least similar pressed parts can be produced or different pressed parts can be produced.

More than two, for example at least three or at least five pressed parts can be pressed in one pressing process.

At least one first lower punch assigned to the first cavity and at least one second lower punch assigned to the second cavity, in particular all lower punches assigned to the first (on the one hand) and the second (on the other hand) cavity, can be moved independently of one another before and/or during the filling of the corresponding cavity or are moveable independently of one another and/or are coupled to different plates (adapter plates). Thus, a height of the cavity or a filling level can also be individually adjusted via the individual positioning of the respective lower punch. Such an adjustment is comparatively simple (for example via a corresponding configuration of a control device), but is not unproblematic due to the then off-centre forces on corresponding plates (adapter plates or adaptor plates).

Accordingly, alternatively, at least one first lower punch associated with the first cavity and at least one second lower punch associated with the second cavity can only be moved together before and/or during filling of the corresponding cavity, or are only movable together accordingly and/or are coupled to the same plate (adapter plate). Such a coupling eliminates the possibility of an individual adjustment of the filling level via an adjustment of the corresponding lower punch. However, the adjustment of the filling level can then particularly preferably be made possible by individually movable individual filling shoes.

The starting material (powder) can be provided for the first and second and possibly further cavity(ies) together (in particular in the case of independently movable lower punches; e.g. via a common filling device, in particular a common filling shoe, with possibly only one chamber for the material) or separately (in particular via separate, preferably separately movable, filling devices, in particular filling shoes) and filled accordingly.

The above-mentioned object is further solved by a powder pressing device for powder pressing at least two pressed parts, in particular ceramic powder pressed parts and/or metal powder pressed parts, in particular for carrying out the above method, comprising at least one first cavity of a die for pressing a first pressed part from a first powder and a second cavity of the die for pressing a second pressed part from a second powder, at least one filling device, in particular at least one, preferably at least one first and one second, filling shoe, for filling the first and the second powder, respectively, into the first and the second cavity, respectively, and at least one control device configured to control the pressing device such that the first powder is filled with a first filling level and the second powder is filled with a second filling level, wherein the first and second filling levels are adjustable independently of each other. With regard to the advantages, reference is made to the explanation for the above method. The powder pressing device (powder press) may have at least one or exactly one, or at least two or exactly two, upper punches and optionally at least one or exactly one, or at least two or exactly two, lower punches per cavity.

The first powder may be similar or different in composition to the second powder. A source for the first and second powder may be identical. Alternatively, the first and second powders may be provided by different sources.

At least one, several or all of the punches (lower punches and/or upper punches) may be moved by electric motor and/or hydraulically. Preferably, first and second filling device, in particular first and second filling shoe are at least temporarily (via a corresponding first and/or second drive device) non-simultaneously movable (or individually movable). Further preferably, the first filling device (the first filling shoe) is removable from the first cavity when the second filling device (the second filling shoe) is arranged above the second cavity.

At least one first lower punch associated with the first cavity and/or at least one second lower punch associated with the second cavity may be supported in a non-floating manner (via a fixed stop) (at least during pressing).

At least one measuring device, in particular weighing device, is preferably provided to measure, preferably weigh, the first and second pressed parts after pressing, in particular individually. Preferably, a determination unit, in particular a calculation unit, can further be provided to preferably determine, preferably calculate, a new first and/or second filling level on the basis of the measurement, in particular the weighing, so that further preferably subsequently a complete filling of that cavity to which a lower filling level has been assigned can take place before the other cavity is completely filled.

At least one first lower punch associated with the first cavity and at least one second lower punch associated with the second cavity, in particular all lower punches associated with the first (on the one hand) and second (on the other hand) cavities, may before and/or during the filling of the corresponding cavity be movable independently of each other and/or coupled to different plates (adapter plates or adaptor plates).

At least one first lower punch associated with the first cavity and at least one second punch associated with the second cavity may before and/or during filling of the corresponding cavity be (only) jointly movable and/or coupled to the same plate (adaptor plate).

The above object is further solved by the use of the pressing device, as described above and below, for powder pressing at least two pressed parts, in particular ceramic powder pressed parts and/or metal powder pressed parts.

Insofar as a height and/or a volume of the corresponding cavity is changed before or during filling, this can be done by relatively moving the die with respect to at least one associated lower punch, for example by moving the die and the associated lower punch remaining in its position or vice versa, or by moving both the die and the lower punch.

In a specific embodiment of the method, two (individual) filling shoes can be arranged next to each other on the pressing device. These are preferably driven by two independent filling axes.

A first filling position can be based on the cavity with a (slightly) lower filling level (for example, also referred to as first cavity with associated first filling shoe). Both filling shoes can then be positioned (driven) (in particular synchronously) above the cavities. The first filling shoe can perform a (basically usual) filling movement and then move back again (in particular to the starting position). The second filling shoe also initially performs a (basically usual) filling movement, but then preferably stops above the second cavity before the final backward movement.

As soon as the first filling shoe is no longer above the first cavity, the die and/or the corresponding lower punches (or plates associated with the lower punches), move to a desired filling position for the second cavity.

After the second filling shoe has finished filling, a usual pressing cycle can be carried out.

Both parts can be weighed individually after pressing. Based on the respective part weight, new filling levels can be calculated and, if necessary, a filling level regulation or filling level adjustment can be performed (automatically).

The cavity with the (slightly) lower filling level can then be filled first.

In an alternative embodiment of the process, each (lower) punch can be coupled with its own plate (adaptor plate). The filling and pressing position of (all) punches can then preferably be set individually.

A press control is preferably configured such that an (individual) filling level adjustment of both cavities (or of the multiple cavities) can be adapted.

Further embodiments result from the dependent claims.

BRIEF DESCRIPTION OF THE DRAWINGS

In the following, the invention is described by means of exemplary embodiments which are explained in more detail with reference to the figures. Hereby show.

DETAILED DESCRIPTION OF THE PREFERRED EMBODIMENTS

In the following description, the same reference numbers are used for identical and equally acting parts.

Figure 1:
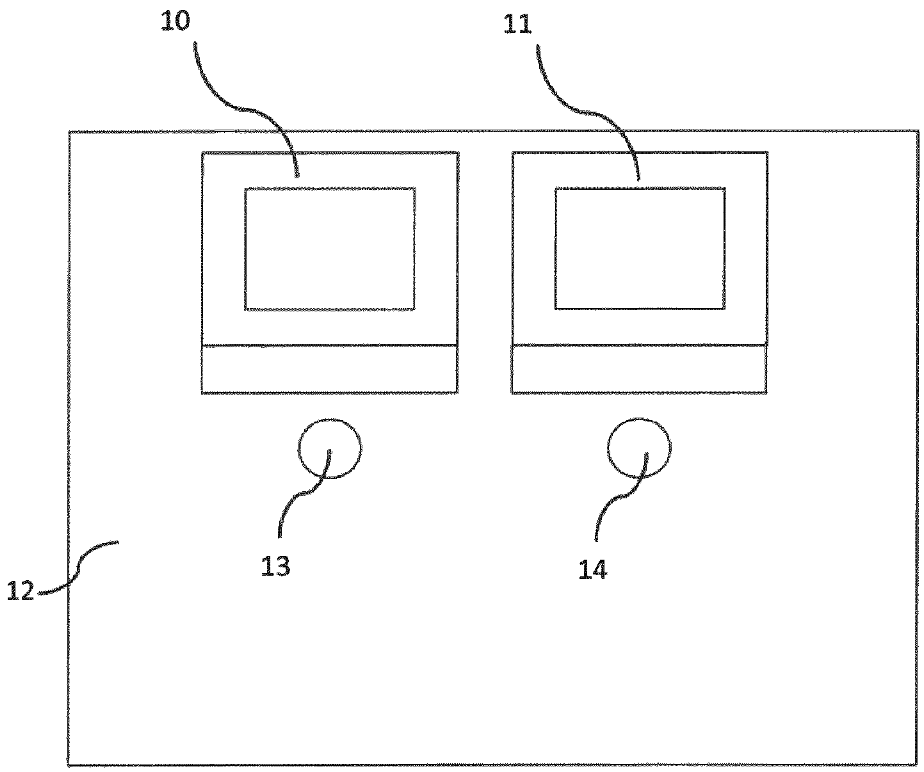
FIG. 1 a first embodiment of a pressing device in a schematic view from above.

FIG. 1 shows a (highly) schematic view of a pressing device according to the invention from above. The pressing device comprises a first filling shoe 10, a second filling shoe 11, a die 12 as well as a first cavity 13 and a second cavity 14. In the first cavity 13, a first pressed part (not shown) can be pressed; in the second cavity 14, a second pressed part (also not shown) can be pressed. In the state of the pressing device according to FIG. 1, the filling shoes 10, 11 are not arranged above the cavities 13, 14. In this state, no starting material (powder) is filled into the cavities 13, 14.

Figure 2:
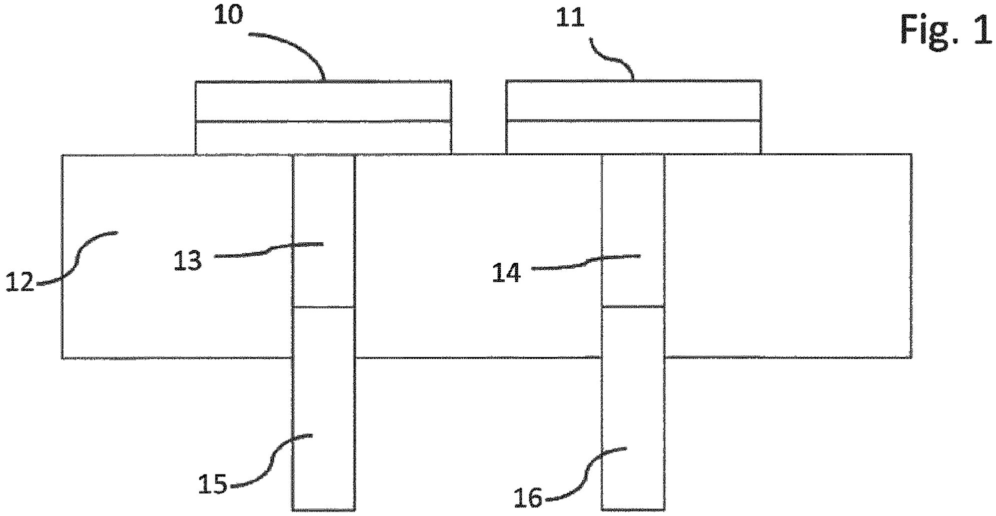
FIG. 2 the embodiment according to FIG. 1 in a schematic sectional view.

According to FIG. 2, the cavities 13, 14 are delimited by a first lower punch 15 and a second lower punch 16. It is also possible to provide several, for example two, lower punches per cavity.

The filling shoes 10, 11 are arranged next to each other or on the same level and are driven by two independent filling axes according to the embodiment.

Figure 3:
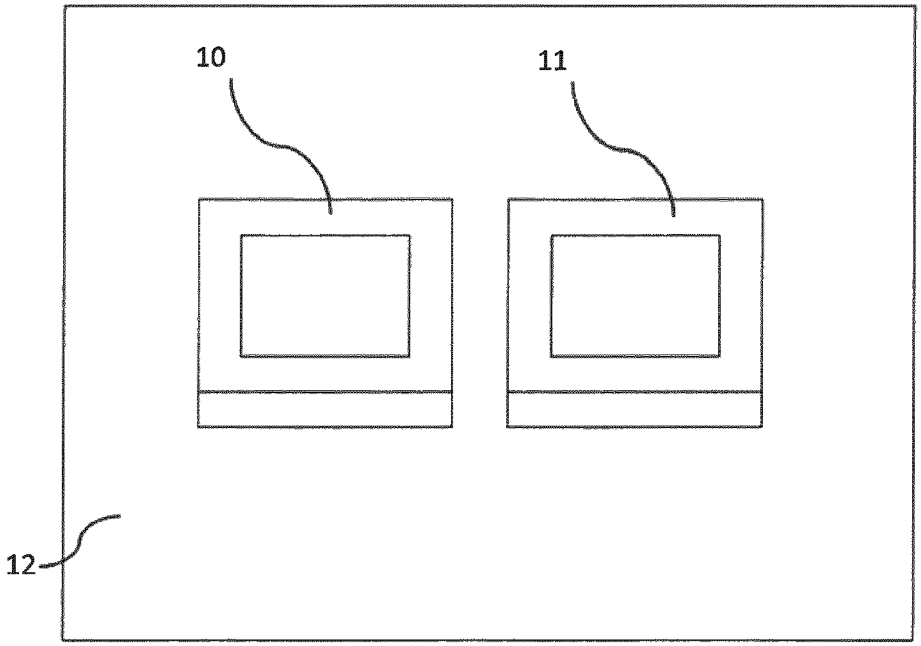
FIG. 3 the embodiment according to FIG. 1 in a different state.
Figure 4:
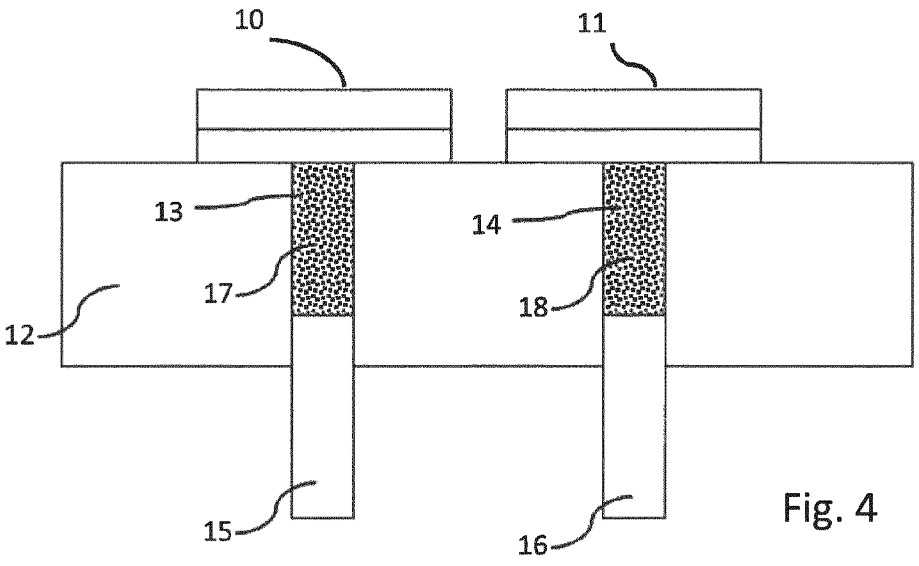
FIG. 4 a schematic sectional view of the state according to FIG. 3.

In FIG. 3, the filling shoes 10, 11 according to FIG. 1 are now arranged above the cavities 13, 14. Thus a first powder 17 (see FIG. 4) and a second powder 18 can be filled into the cavities 13, 14. In FIG. 4 the cavities (in their extension according to FIG. 4) are filled up to an upper edge of the same with the respective powder 17, 18. An upper end of the respective filling in the first cavity 13 is thus at the level of an upper end of the filling of the second cavity 14. Here, in the same way, a lower end of the filling in the first cavity 13 is (which is not obligatory) at the level of a lower end of the filling in the first cavity 14.

In FIG. 4 thus a first filling position (of the lower punches 15, 16, which are preferably movable together here) is shown. This first filling position preferably depends on the cavity with the lower (required or necessary) filling level. According to the embodiment, both filling shoes can be moved synchronously over the cavities 13, 14.

Figure 5:
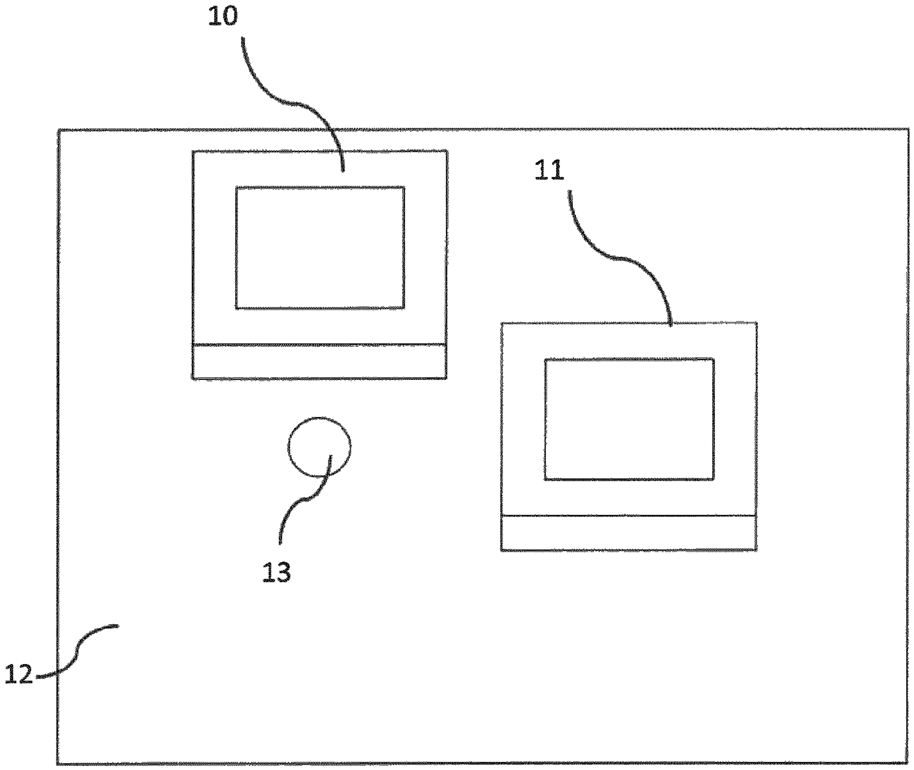
FIG. 5 a schematic representation of the embodiment according to FIG. 1 in a view from above in a further state.
Figure 6:
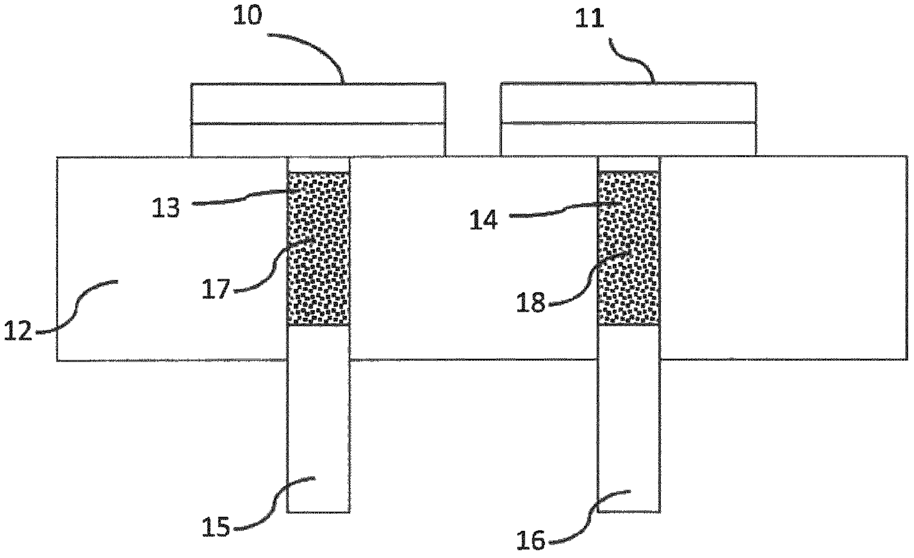
FIG. 6 a schematic sectional view of the state according to FIG. 5.
Figure 7:
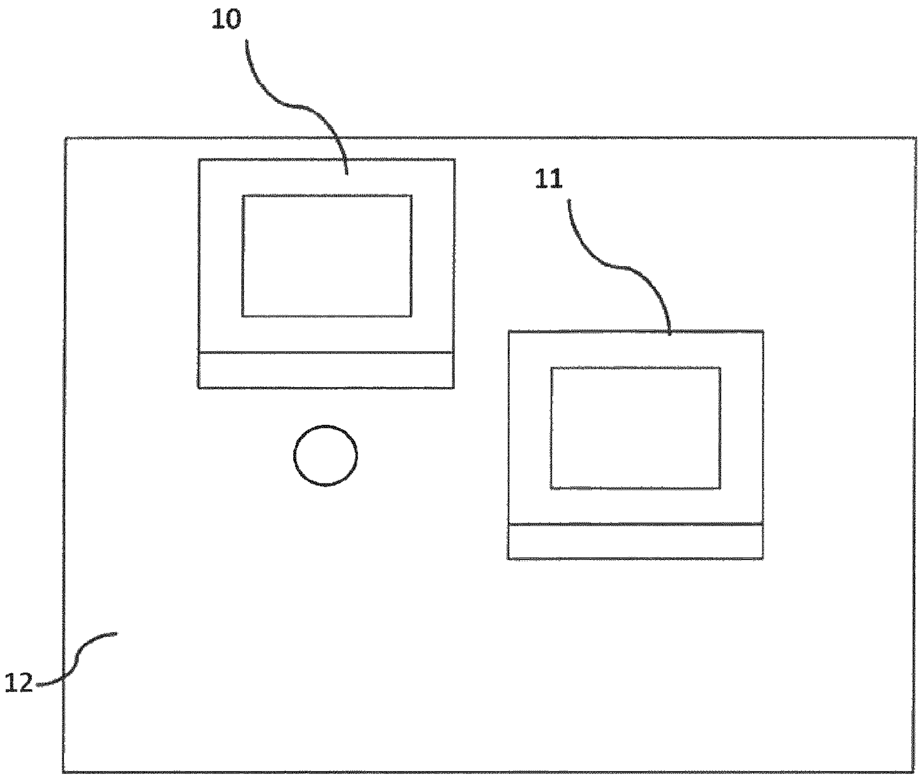
FIG. 7 a schematic view of the embodiment according to FIG. 1 from above in a further state.

The first filling shoe 10 carries out a filling process and then moves back to its starting position (see FIG. 5). The second filling shoe 11 remains stationary above the associated cavity 14 (after it has also carried out a filling process).

Figure 8:
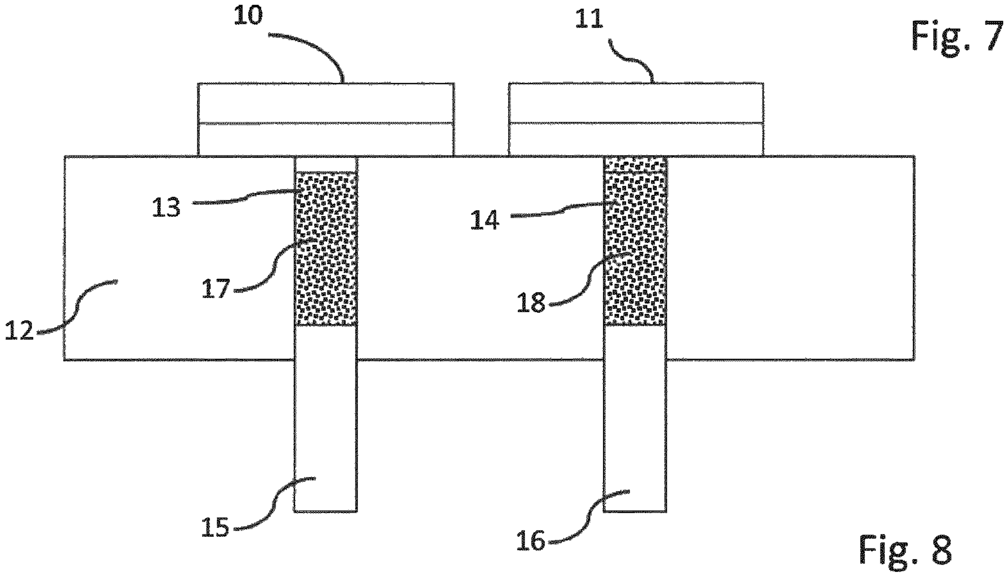
FIG. 8 the state according to FIG. 7 in a schematic sectional view.
Figure 9:
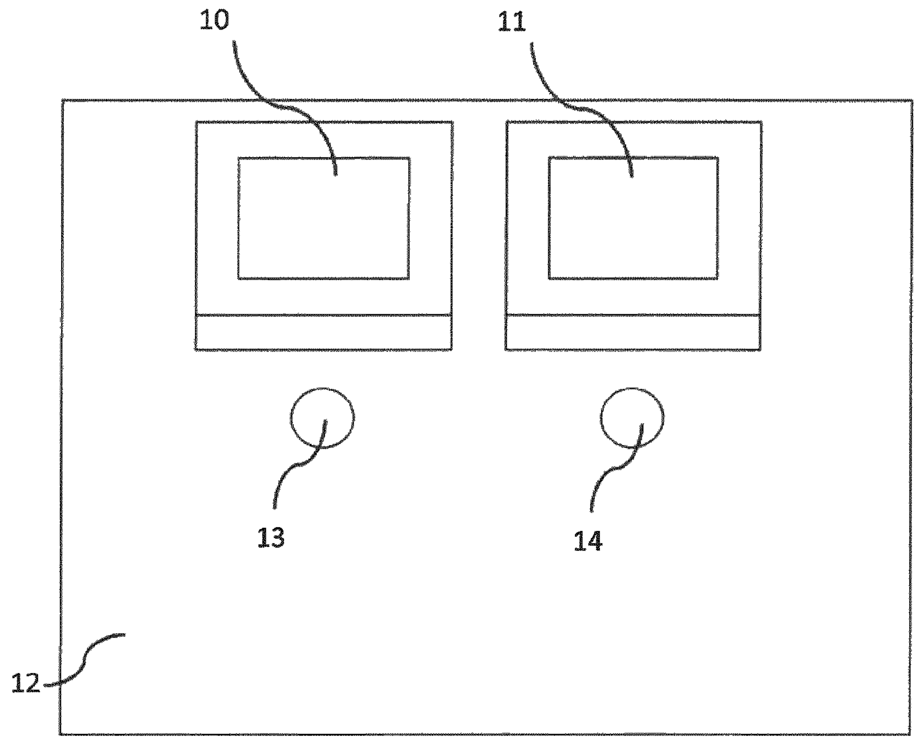
FIG. 9 a further embodiment of the pressing device in a schematic view from above.
Figure 10:
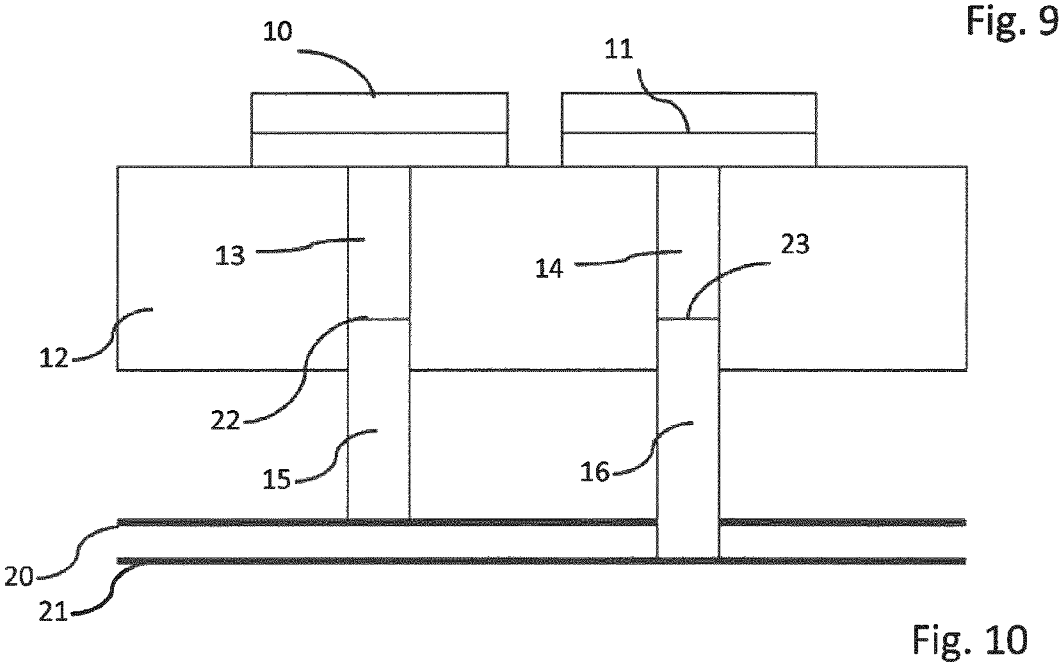
FIG. 10 a schematic sectional view of the embodiment according to FIG. 9.

At a time when the first filling shoe 10 is no longer above the associated cavity 13, the die 12 and/or at least one plate (not shown) associated with the lower punches 15, 16 is moved, thus resulting in a relative movement between die and punches 15, 16 (see FIG. 8). This allows further material of the second powder 18 to be filled into the second cavity 14. Overall, the filling level in the second cavity 14 is thus greater than in the first cavity 13.

After the second filling shoe 11 has completed the (complete) filling, a pressing cycle is performed in a known manner.

After pressing, the pressed parts coming from the two cavities are weighed (individually). Based on the respective part weight, new filling levels are calculated and, if necessary, a filling level adjustment is carried out (automatically).

At first, then the cavity with the compared lower (required or necessary) filling level is filled.

FIGS. 9-14 show an alternative embodiment. Here the first lower punch 15 and the second lower punch 16 are movable via a first lower punch plate 20 and a second lower punch plate 21, respectively. In the initial position according to FIGS. 9 and 10, the filling shoes 10, 11 are not above the associated cavities 13, 14 and upper ends 22, 23 of the lower punches 15, 16 are on the same level. In this state the cavities 13, 14 are of the same height.

Figure 11:
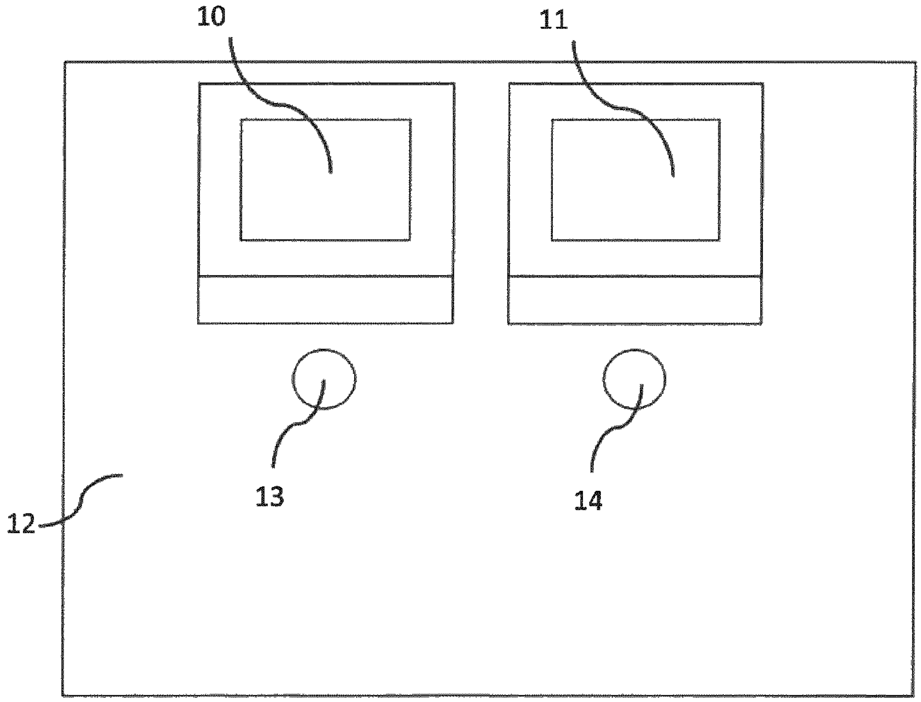
FIG. 11 a top view of the embodiment according to FIG. 9 in a further state.
Figure 12:
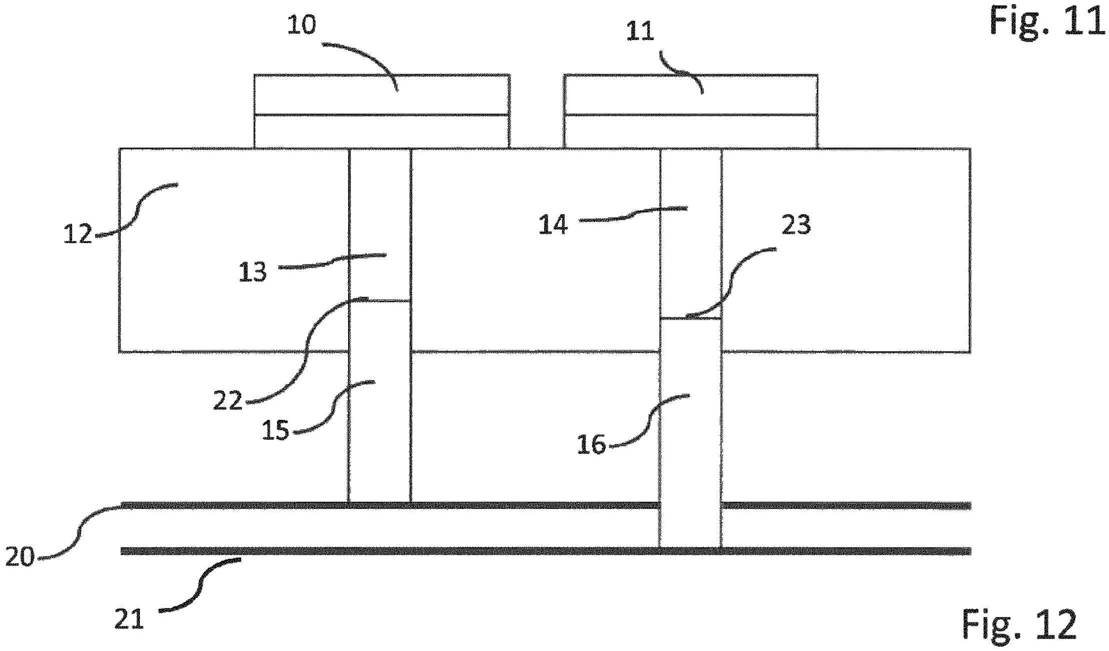
FIG. 12 a schematic sectional view of the state according to FIG. 11.
Figure 13:
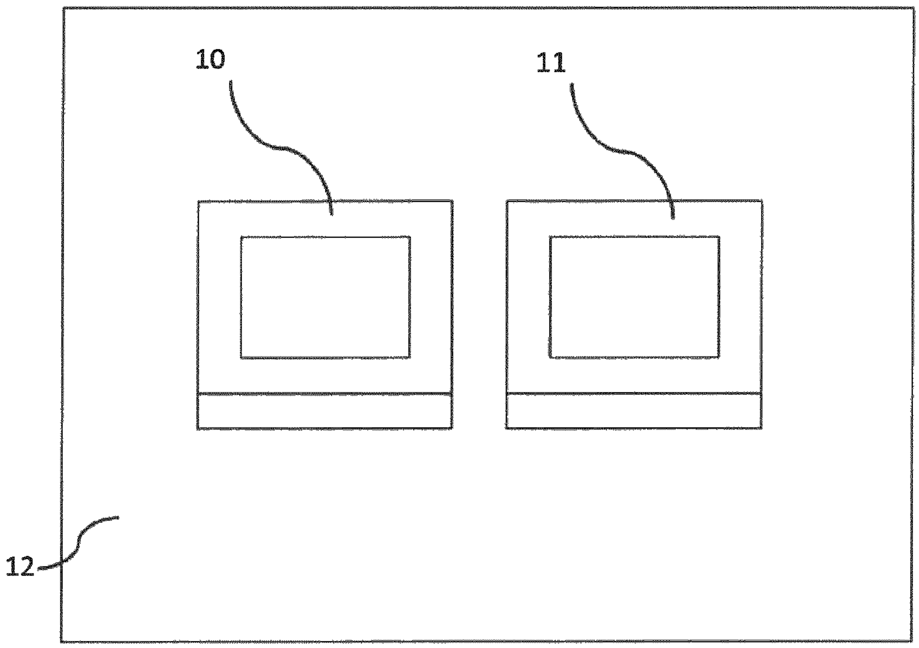
FIG. 13 the embodiment according to FIG. 9 in a schematic view from above in a further state.

Now, according to FIGS. 11, 12, the second lower punch plate 21 is moved downwards, the first lower punch plate 20 remaining in the same place in this case (although it can also be moved if necessary). The filling shoes 10, 11 (see FIG. 11) are still in their initial position (but may also already be at least partially displaced).

Figure 14:
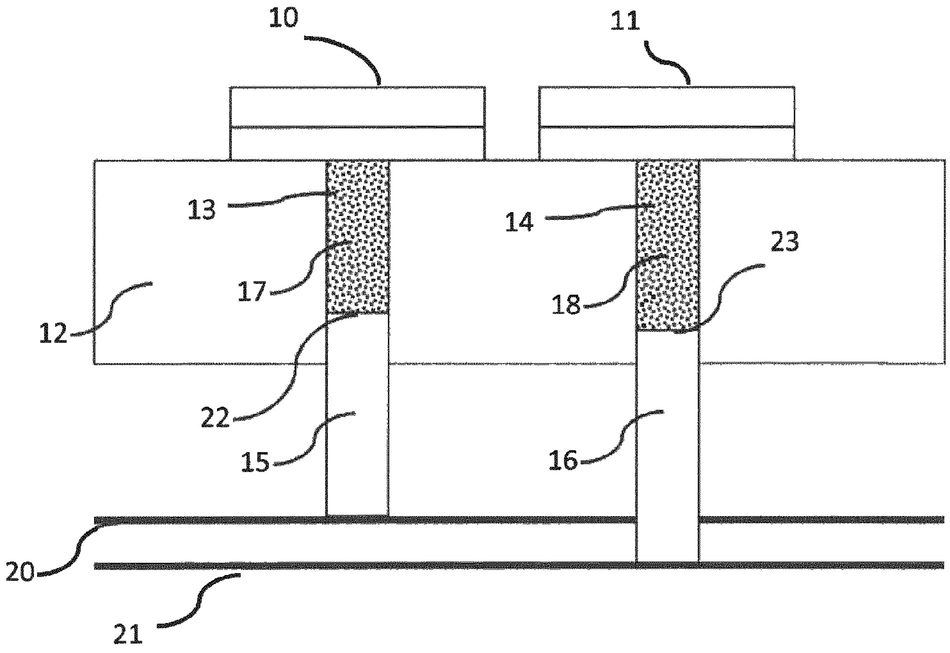
FIG. 14 a schematic sectional view of the state according to FIG. 13.

Now the filling shoes 10, 11 (see FIG. 13) are placed above the cavities 13, 14 (in a joint or individual movement). After the cavity 14 has been enlarged according to FIG. 12, the filling level of the second powder material 18 correspondingly shown in FIG. 14 is now also enlarged. In this embodiment, the filling and pressing position of several, possibly all, punches can be adjusted individually. A corresponding programming may be provided for the individual filling level adjustment.

At this point, it should be noted that all of the parts described above, taken individually and in any combination, in particular the details shown in the drawings, are claimed to be essential to the invention. Modifications hereof are familiar to the person skilled in the art.

REFERENCE SIGNS

10 First filling shoe
11 Second filling shoe
12 Die
13 First cavity
14 Second cavity
15 First lower punch
16 Second lower punch
17 First powder
18 Second powder
20 First lower punch plate
21 Second lower punch plate
22 Upper end of first lower punch 15
23 Upper end of second lower punch 16

What is claimed is:

1. A method for powder pressing at least two pressed parts, wherein the pressed parts are ceramic powder pressed parts and/or metal powder pressed parts, the method comprising:

filling a first powder for pressing a first pressed part into a first cavity of a die with a first filling level, and filling a second powder for pressing a second pressed part into a second cavity of the die with a second filling level, wherein the first and second filling levels are individually adjusted, wherein the first powder is filled via a first filling shoe, and the second powder is filled via a second filling shoe, and wherein the first and second filling shoe are configured to move temporarily non-simultaneously such that the first filling shoe is already removed from the first cavity while the second filling shoe still remains above the second cavity.

2. The method according to claim 1, wherein:

during filling into at least one cavity, at least two filling operations are carried out, wherein a first filling operation for filling the second powder into the second cavity takes place before and/or during a filling operation for filling the first powder into the first cavity and a second filling operation for filling the second powder into the second cavity takes place, while no filling operation for filling the first powder into the first cavity takes place after the first filling shoe has already been moved away from the first cavity.

3. The method according to claim 1, wherein a complete filling of the first cavity is completed before a complete filling of the second cavity is completed.

4. The method according to claim 1, wherein at least one first lower punch associated with the first cavity and/or at least one second lower punch associated with the second cavity are supported in a non-floating manner.

5. The method according to claim 1, wherein a measurement of the first and second pressed parts is obtained individually, after pressing, wherein on the basis of the measurement, a new first and/or second filling level is calculated, and subsequently a complete filling of that cavity to which a lower filling level has been assigned takes place before the other cavity is completely filled.

6. The method according to claim 1, wherein the first and/or second cavity after the respective filling and/or immediately before an interruption of the respective filling and/or immediately before a pressing operation is/are filled to its/their respective upper edge or is/are not filled to its/their respective upper edge, such that the second cavity is filled to its upper edge after the filling and the first cavity is not, and/or after the respective filling of the first and second cavities and/or immediately before a pressing operation, an upper end of a first filling in the first cavity and an upper end of a second filling in the second cavity are at the same height or at different heights and/or a lower end of the first filling in the first cavity and a lower end of the second filling in the second cavity are at the same height or at different heights.

7. The method according to claim 1, wherein at least one first lower punch associated with the first cavity and at least one second lower punch associated with the second cavity are moved before and/or during the filling of the corresponding cavity independently of each other and/or are coupled to different plates.

8. The method according to claim 1, wherein at least one first lower punch associated with the first cavity and at least one second lower punch associated with the second cavity before and/or during the filling of the corresponding cavity are moved or movable only together and/or are coupled to the same plate.

9. The method according to claim 2, wherein the at least two filling operations are carried out during filling into the second cavity.

10. The method according to claim 5, wherein the measurement is a weight.

* * * * *